(12) United States Patent
Knox et al.

(10) Patent No.: US 10,882,424 B2
(45) Date of Patent: Jan. 5, 2021

(54) CONTROLLING ACTIVE ISOLATION PLATFORM IN A MOVING VEHICLE

(71) Applicant: ClearMotion Acquisition I LLC, Woburn, MA (US)

(72) Inventors: Lawrence D. Knox, Hopkinton, MA (US); Travis Lee Hein, Holliston, MA (US)

(73) Assignee: ClearMotion Acquisition I LLC, Billerica, MA (US)

( * ) Notice: Subject to any disclaimer, the term of this patent is extended or adjusted under 35 U.S.C. 154(b) by 0 days.

(21) Appl. No.: 15/941,646

(22) Filed: Mar. 30, 2018

(65) Prior Publication Data

US 2018/0290567 A1    Oct. 11, 2018

Related U.S. Application Data

(63) Continuation of application No. 14/934,526, filed on Nov. 6, 2015, now Pat. No. 9,944,206.

(51) Int. Cl.
| | | |
|---|---|---|
| *B60N 2/39* | (2006.01) | |
| *B60N 2/10* | (2006.01) | |
| *B60N 2/02* | (2006.01) | |

(52) U.S. Cl.
CPC ............... *B60N 2/39* (2013.01); *B60N 2/10* (2013.01); *B60N 2002/0212* (2013.01); *B60N 2002/0268* (2013.01)

(58) Field of Classification Search
CPC ............. B60N 2/39; B60N 2002/0268; B60N 2002/0212; B60N 2/10
See application file for complete search history.

(56) References Cited

U.S. PATENT DOCUMENTS

| | | |
|---|---|---|
| 3,153,426 A | 10/1964 | Milster |
| 5,321,617 A | 6/1994 | Mori et al. |

(Continued)

FOREIGN PATENT DOCUMENTS

| | | |
|---|---|---|
| CN | 104972932 A | 10/2015 |
| EP | 0 401 092 A1 | 12/1990 |

(Continued)

OTHER PUBLICATIONS

International Search Report and Written Opinion for International Application No. PCT/US2016/060159, dated Feb. 28, 2017.

(Continued)

*Primary Examiner* — Hunter B Lonsberry
*Assistant Examiner* — Mathew Franklin Gordon
(74) *Attorney, Agent, or Firm* — Wolf, Greenfield & Sacks, P.C.

(57) ABSTRACT

Systems and methods for actively isolating a payload from a disturbance. In one example, a seat system for a vehicle includes a seat, a support structure that allows the seat to move about an axis of a pivot, a first sensor positioned to detect movement of the vehicle, a second sensor positioned to detect lateral acceleration of the pivot, an actuator configured to move the seat, and a controller configured to receive a first signal from the first sensor and a second signal from the second sensor, generate a command signal based at least on the first and the second signal to instruct the actuator to position the seat at a desired command angle, wherein the controller is configured to correct the command signal for lateral accelerations caused by steering the vehicle, and provide a force command to the actuator to move the seat at the desired command angle.

19 Claims, 7 Drawing Sheets

(56) References Cited

U.S. PATENT DOCUMENTS

| | | |
|---|---|---|
| 5,857,535 A | 1/1999 | Brooks |
| 6,068,280 A | 5/2000 | Torres |
| 6,637,816 B2 | 10/2003 | Pavlov et al. |
| 6,746,049 B2 | 6/2004 | Pavlov et al. |
| 8,095,268 B2 | 1/2012 | Parison et al. |
| 9,610,862 B2 | 4/2017 | Bonk et al. |
| 9,758,073 B2 | 9/2017 | Knox |
| 9,902,300 B2 | 2/2018 | Hein |
| 9,944,206 B2 | 4/2018 | Knox et al. |
| 10,029,586 B2 | 7/2018 | Hein |
| 10,328,827 B2 | 6/2019 | Knox |
| 2001/0035600 A1 | 11/2001 | St. Clair |
| 2001/0037169 A1 | 11/2001 | St. Clair |
| 2004/0089488 A1 | 5/2004 | Bremner |
| 2006/0253240 A1* | 11/2006 | Rao .................. B60W 50/0205 701/48 |
| 2006/0261647 A1 | 11/2006 | Maas et al. |
| 2007/0260383 A1 | 11/2007 | Sundaram et al. |
| 2008/0255734 A1 | 10/2008 | Altshuller |
| 2009/0088930 A1 | 4/2009 | Ohtsubo et al. |
| 2009/0312974 A1 | 12/2009 | Douglas |
| 2010/0114420 A1 | 5/2010 | Doi |
| 2011/0172886 A1 | 7/2011 | Taira et al. |
| 2013/0131923 A1 | 5/2013 | Tzipman |
| 2014/0225412 A1 | 8/2014 | Sugiyama |
| 2014/0316637 A1 | 10/2014 | Rhode et al. |
| 2014/0316661 A1* | 10/2014 | Parker .................. B60N 2/39 701/49 |
| 2014/0358378 A1 | 12/2014 | Howard et al. |
| 2015/0081171 A1 | 3/2015 | Ericksen et al. |
| 2016/0101664 A1 | 4/2016 | Richter |
| 2016/0101710 A1 | 4/2016 | Bonk et al. |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2018/0022242 A1 | 1/2018 | Knox |
| 2018/0208086 A1 | 7/2018 | Hein et al. |

FOREIGN PATENT DOCUMENTS

| | | | |
|---|---|---|---|
| EP | 1 278 655 B1 | 1/2005 | |
| EP | 2 431 218 A1 | 3/2012 | |
| GB | 2 313 214 A | 11/1997 | |
| WO | WO 97/28981 A1 | 8/1997 | |
| WO | WO 01/83261 A1 | 11/2001 | |
| WO | WO-2017079330 A1 * | 5/2017 | ............... B60N 2/10 |

OTHER PUBLICATIONS

Jin et al., Assessment of driver's seating discomfort using interface pressure distribution. 2009 IEEE Intelligent Vehicles Symposium. 2009:1419-24.

Kukke et al., The effects of trunk stimulation on bimanual seated workspace. IEEE Transactions on Neural Systems and Rehabilitation Engineering. Jun. 2004;12(2):177-85.

Peng et al., Research on the Behavior of a Passenger Car in JRS Virtual Testing. 2013 Fifth International Conference on Measuring Technology and Mechatronics Automation. 2013:930-3.

Tyrell et al., Preparations for a train-to-train impact test of crash-energy management passenger rail equipment. Proceedings of the 2005 ASME/IEEE Joint Rail Conference. 2005:107-116.

Ziraknejad et al., Vehicle occupant head position quanitification using an array of capacitive proximity sensors. IEEE Transactions on Vehicular Technology. 2015;64(6):2274-87.

U.S. Appl. No. 15/874,229, filed Jan. 18, 2018, Hein et al.
U.S. Appl. No. 14/934,465, filed Nov. 6, 2015, Hein.
U.S. Appl. No. 16/017,993, filed Jun. 25, 2018, Hein.
U.S. Appl. No. 15/700,798, filed Sep. 11, 2017, Knox.
PCT/US2016/060159, Feb. 28, 2017, International Search Report and Written Opinion.

* cited by examiner

CONTROLLING ACTIVE ISOLATION PLATFORM IN A MOVING VEHICLE

RELATED APPLICATIONS

This application is a Continuation of U.S. application Ser. No. 14/934,526, filed Nov. 6, 2015, the disclosure of which is incorporated herein by reference in its entirety.

TECHNICAL FIELD

Aspects and implementations of the present disclosure are directed generally to payload suspension, and in some examples, more specifically to vehicle seats and methods for actively isolating a payload from vehicle movement.

BACKGROUND

In a Cartesian coordinate system (x, y, and z directions) a payload held by a platform may be subject to motion in various directions. For example, an occupant positioned upon a vehicle seat, an occupant positioned within a wheelchair, or an occupant within a neonatal incubator, may be subject to motion in up to six directions of freedom, including rotation and translation about each of a roll, pitch, and yaw axis. Due to uneven earth surfaces, the payload often experiences disturbances in travel when a vehicle attached to the platform encounters obstructions. In particular, disturbances as a result of surface condition can be especially dramatic when the platform includes a rigid or stiff suspension system, such as those typically found in tractors and other heavy machinery.

SUMMARY

In accordance with aspects of the present disclosure, there are provided systems and methods for actively isolating a payload from a disturbance. For example, there are provided a vehicle seat, a seat system for a vehicle, and methods for controlling movement of a vehicle seat about one or more axes, such as a roll or a pitch axis, based on at least a measured lateral acceleration of a pivot point about which the seat moves. In one example, a seat system includes a seat configured to move at a command angle, and a controller configured to generate a command signal to instruct an actuator coupled to the seat to adjust the command angle to compensate for movement of the vehicle. Accordingly, various implementations provide systems and methods for actively isolating a payload, such as an occupant of a vehicle seat, from movement and disruptive forces. In such implementations, the payload is maintained at a static position despite movement or rotation of the vehicle.

In particular, several aspects of the present disclosure address the undesired effects on the command signal of lateral accelerations caused by steering (i.e., cornering accelerations) the vehicle. Several implementations generate the command signal responsive to receiving a rotation of the vehicle and a lateral acceleration of the pivot point. The lateral acceleration of the pivot point is corrected by removing any lateral acceleration caused by steering the vehicle. Such aspects and implementations provide a more natural, isolated, and disturbance-free travel experience for the payload. While various aspects and implementations are described herein with reference to a vehicle seat or a vehicle seat system, further aspects and implementations may include other platforms systems for supporting a payload sensitive to disturbance, such as wheelchairs, gurneys, beds, neonatal incubators, and heavy machinery.

According to one aspect, provided is a seat system for a vehicle. The seat system may include a seat, a support structure coupled to the seat that allows the seat to move about a first axis of a pivot, a first sensor positioned to detect movement of the vehicle, a second sensor positioned to detect lateral acceleration of the pivot, an actuator configured to move the seat, and a controller configured to receive a first signal from the first sensor and a second signal from the second sensor, generate a command signal based at least in part on the first signal and the second signal to instruct the actuator to position the seat at a desired command angle, wherein the controller is configured to correct the command signal for lateral accelerations caused by steering the vehicle, and provide a force command to the actuator to move the seat at the desired command angle based on at least the command signal.

In one example, the first signal includes at least a roll rate of the vehicle about a second axis, and the second signal includes a lateral acceleration of the pivot in a direction substantially perpendicular to a direction of travel of the vehicle. According to an example, the seat system may further include a third sensor positioned to detect a yaw rate of the vehicle, and the controller may be configured to generate the command signal according to:

$$\theta_1 + \frac{\iint (\ddot{x} - (\text{speed} * \text{yaw rate}))}{L_2},$$

wherein
$\theta_1$ is a rotation of the vehicle about the second axis, $\ddot{x}$ is the lateral acceleration of the pivot, speed is a speed of the vehicle, yaw rate is the yaw rate of the vehicle, and $L_2$ is a distance between the first axis and a substantially center virtual point of the payload. In a further example, the seat system may further include a global positioning system (GPS) configured to calculate the speed of the vehicle. In one example, the second sensor is positioned at the pivot.

According to one example, the controller is further configured to determine a frequency of the first signal and generate the command signal based on at least the first signal and the second signal and correct the command signal for lateral accelerations caused by steering the vehicle if the frequency of the first signal is greater than or equal to a reference threshold, and generate the command signal based on the first signal when the frequency of the first signal is less than the reference threshold. In a further example, the reference threshold includes a frequency between about 0.1 Hz and about 1.0 Hz. In one example, the seat system may further include a third sensor positioned to detect a yaw rate of the vehicle, and the controller may be configured to generate the command signal according to:

$$\theta_1 + \frac{\iint (\ddot{x} - (\text{speed} * \text{yaw rate}))}{L_2},$$

wherein
$\theta_1$ is a rotation of the vehicle about the second axis, $\ddot{x}$ is the lateral acceleration of the pivot, speed is a speed of the vehicle, yaw rate is the yaw rate of the vehicle, and $L_2$ is a distance between the first axis and a substantially center virtual point of the payload, when the frequency of the first signal is greater than or equal to the reference threshold. In a further example, the controller is configured to generate the command signal according to:

$$\theta_1 + \left(\frac{L_1}{L_2}\right)\theta_1,$$

wherein
$\theta_1$ is the rotation of the vehicle about the second axis, $L_2$ is the distance between the first axis and the substantially center virtual point of the payload, and $L_1$ is a distance between the second axis and the first axis, when the frequency of the first signal is less than the reference threshold.

According to one example, the second axis is substantially parallel to a direction of travel of the vehicle, and the actuator is further configured to rotate the seat in substantially an opposite direction from a rotation of the vehicle.

Another aspect is directed to a method of controlling seat movement in a vehicle. In one example, the method may include receiving a first signal from a first sensor positioned to detect movement of the vehicle, receiving a second signal from a second sensor positioned to detect lateral acceleration of a pivot including a first axis about which a support structure coupled to a seat allows movement of the seat, generating a command signal based at least in part on the first signal and the second signal to instruct an actuator to position the seat at a desired command angle, wherein generating the command signal includes correcting the command signal for lateral accelerations caused by steering the vehicle, and providing a force command to the actuator to move the seat at the desired command angle based on at least the command signal.

In one example, the first signal includes at least a roll rate of the vehicle about a second axis, and the second signal includes a lateral acceleration of the pivot in a direction substantially perpendicular to a direction of travel of the vehicle. In a further example, the method may further include receiving a third signal from a third sensor positioned to detect a yaw rate of the vehicle, and generating the command signal may include generating the command signal according to:

$$\theta_1 + \frac{\int\int(\ddot{x} - (\text{speed} * \text{yaw rate}))}{L_2},$$

wherein
$\theta_1$ is a rotation of the vehicle about the second axis, $\ddot{x}$ is the lateral acceleration of the pivot, speed is a speed of the vehicle, yaw rate is the yaw rate of the vehicle, and $L_2$ is a distance between the first axis and a substantially center virtual point of the payload. According to one example, the method may further include receiving the speed of the vehicle from a global positioning system (GPS).

According to one example, the method may further include determining a frequency of the first signal, and generating the command signal based on at least the first signal and the second signal may include generating the command signal based on at least the first signal and the second signal when a frequency of the first signal is greater than or equal to a reference threshold, and the method further comprises generating the command signal based on the first signal when the frequency of the first signal is less than the reference threshold. In a further example, the reference includes a frequency between about 0.1 Hz and about 1.0 Hz.

In one example, the method may further include receiving a third signal from a third sensor positioned to detect a yaw rate of the vehicle, and generating the command signal based on at least the first signal and the second signal when the frequency of the first signal is greater than or equal to the reference threshold may include generating the command signal according to:

$$\theta_1 + \frac{\int\int(\ddot{x} - (\text{speed} * \text{yaw rate}))}{L_2},$$

wherein
$\theta_1$ is a rotation of the vehicle about the second axis, $\ddot{x}$ is the lateral acceleration of the pivot, speed is a speed of the vehicle, yaw rate is the yaw rate of the vehicle, and $L_2$ is a distance between the first axis and a substantially center virtual point of the payload. In one example, generating the command signal based on the first signal when the frequency of the first signal is less than the reference threshold includes generating the command signal according to:

$$\theta_1 + \left(\frac{L_1}{L_2}\right)\theta_1,$$

wherein
$\theta_1$ is the rotation of the vehicle about the second axis, $L_2$ is the distance between the first axis and the substantially center virtual point of the payload, and $L_1$ is a distance between the second axis and the first axis.

Another aspect is directed to a vehicle seat. In one example, the vehicle seat may include a seat configured to move at a command angle about a first axis of a pivot relative to a substantially horizontal orientation, and a controller configured to receive a first signal of detected movement of a vehicle and a second signal of detected lateral acceleration of the pivot, and generate a command signal based on at least the first signal and the second signal to instruct an actuator to position the seat at a desired command angle, wherein the controller is configured to correct the command signal for lateral accelerations caused by steering the vehicle.

In one example, the controller is further configured to provide a force command to move the seat at the desired command angle based on at least the command signal. According to one example, the first signal includes at least a roll rate of the vehicle about a second axis, and the second signal includes a lateral acceleration of the pivot in a direction substantially perpendicular to a direction of travel of the vehicle. In one example, the controller is further configured to receive a detected yaw rate of the vehicle, and the controller is configured to generate the command signal according to:

$$\theta_1 + \frac{\int\int(\ddot{x} - (\text{speed} * \text{yaw rate}))}{L_2},$$

wherein $\theta_1$ is a rotation of the vehicle about the second axis, $\ddot{x}$ is the lateral acceleration of the pivot, speed is a speed of the vehicle, yaw rate is the yaw rate of the vehicle, and $L_2$ is a distance between the first axis and a substantially center virtual point of the payload.

According to one example, the controller is further configured to determine a frequency of the first signal and generate the command signal based on at least the first signal and the second signal and correct the command signal for lateral accelerations caused by steering the vehicle if the frequency of the first signal is greater than or equal to a reference threshold, and generate the command signal based on the first signal when the frequency of the first signal is less than the reference threshold. In a further example, the reference threshold includes a frequency between about 0.1 Hz and about 1.0 Hz.

In one example, the controller is further configured to receive a detected yaw rate of the vehicle, and the controller is configured to generate the command signal according to:

$$\theta_1 + \frac{\int\int(\ddot{x} - (\text{speed} * \text{yaw rate}))}{L_2},$$

wherein
$\theta_1$ is a rotation of the vehicle about the second axis, $\ddot{x}$ is the lateral acceleration of the pivot, speed is a speed of the vehicle, yaw rate is the yaw rate of the vehicle, and $L_2$ is a distance between the first axis and a substantially center virtual point of the payload, when the frequency of the first signal is greater than or equal to the reference threshold. According to one example, the controller is configured to generate the command signal according to:

$$\theta_1 + \left(\frac{L_1}{L_2}\right)\theta_1,$$

wherein
$\theta_1$ is the rotation of the vehicle about the second axis, $L_2$ is the distance between the first axis and the substantially center virtual point of the payload, and $L_1$ is a distance between the second axis and the first axis, when the frequency of the first signal is less than the reference threshold.

Still other aspects, examples, and advantages of these exemplary aspects are discussed in detail below. Further implementations may include means for performing any of the processes recited herein. Moreover, it is to be understood that both the foregoing information and the following detailed description are merely illustrative examples of various aspects, and are intended to provide an overview or framework for understanding the nature and character of the claimed subject matter. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

Furthermore, in the event of inconsistent usages of terms between this document and documents incorporated herein by reference, the term usage in the incorporated references is supplementary to that of this document; the term usage in this document controls. In addition, the accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

DETAILED DESCRIPTION

Figure 1A:
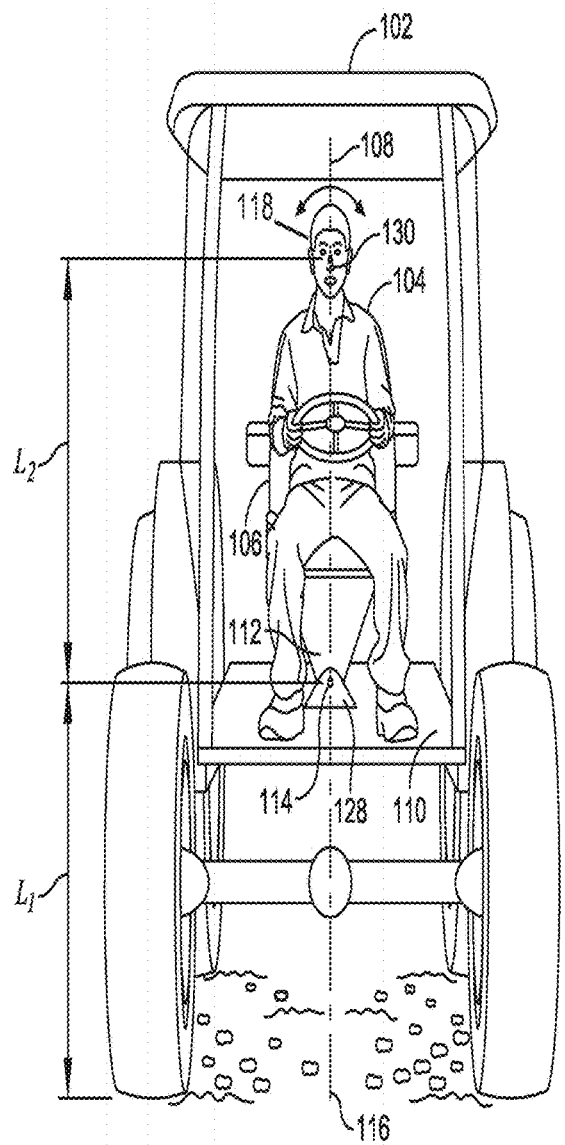
FIG. 1A is an illustration of a vehicle.

Aspects and implementations disclosed herein are not limited to the details of construction and the arrangement of components set forth in the following description or illustrated in the drawings. Aspects and implementations disclosed herein are capable of being practiced or of being carried out in various ways.

In accordance with aspects of the present disclosure, there are provided systems and methods for actively isolating a payload supported by a platform from a disturbance. In at least one example, this may include a vehicle seat, a seat system for a vehicle, and methods for controlling motion of a vehicle seat to isolate an occupant from movement of the vehicle. In particular, various aspects and implementations maintain a payload at a static position despite movement or rotation of the vehicle. In one example, a seat system includes a seat configured to move at a command angle, and a controller configured to generate a command signal to instruct an actuator coupled to the seat to adjust the command angle to compensate for movement of the vehicle. In contrast to previous attempts of controlling seat movement that rely on one or more geometric assumptions about motion characteristics of the vehicle, various aspects and implementations generate a command signal based at least in part on a lateral acceleration of a pivot about which the seat rotates. Generating command signal based at least in part on the lateral acceleration of the pivot, and in various examples, the rotation of the vehicle, enables a significant improvement in performance due to improved accuracy in tracking vehicle motion.

Further examples further improve the performance of previous payload active isolation systems and methods by correcting the influence of lateral accelerations caused by steering the vehicle (i.e., turning accelerations), on the command signal. Without correction, in some situations turning accelerations may cause the command signal to become inappropriately, and/or dangerously, large during normal driving conditions. Accordingly, various aspects and implementations determine and correct the command signal for lateral accelerations caused by steering. Such aspects and implementations provide a more natural, isolated, and disturbance-free travel experience for the payload. While various aspects and implementations are described herein with reference to a vehicle seat or vehicle seat system, further aspects and implementations may include other systems and apparatuses for supporting a payload sensitive to disturbance.

Figure 1B:
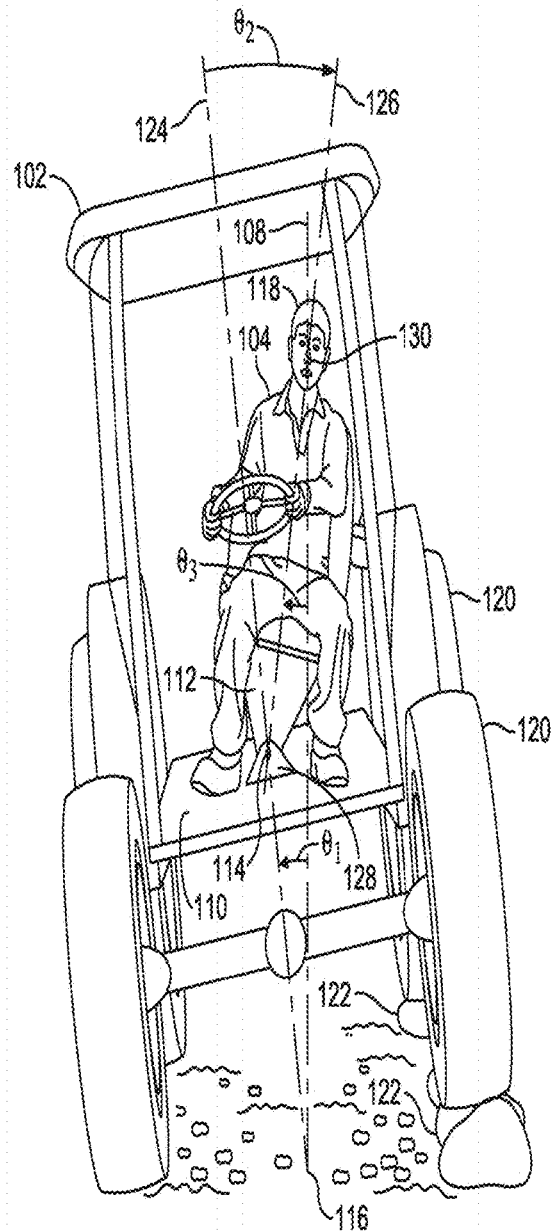
FIG. 1B is an illustration of the vehicle of FIG. 1A experiencing a roll event.
Figure 7:
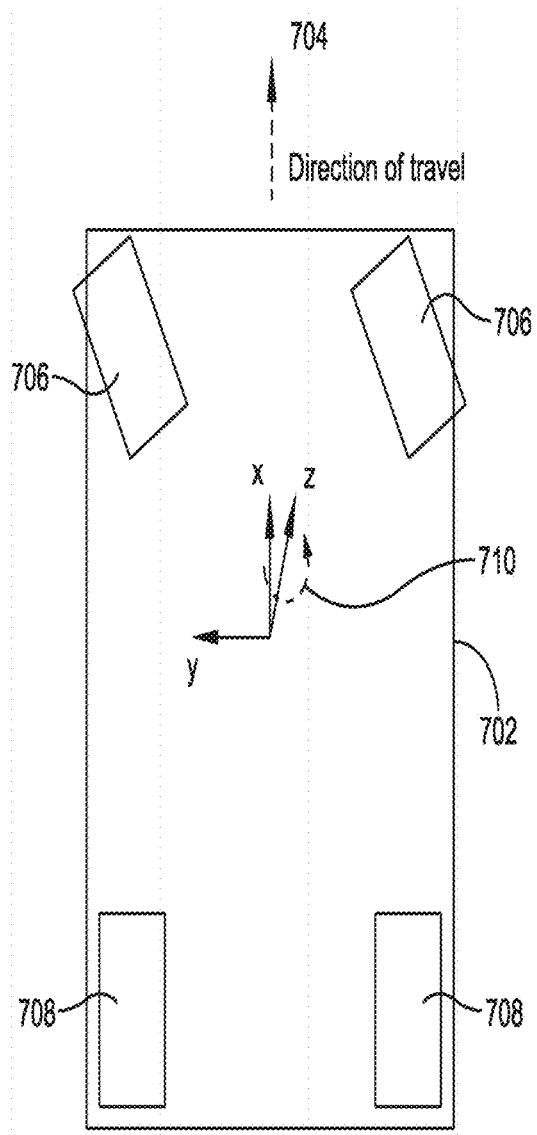
FIG. 7 is an example illustration of a coordinate system for a vehicle according to various aspects discussed herein.

Several examples discussed herein include a vehicle seat and a seat system for a vehicle. FIGS. 1A and 1B illustrate an example seat and seat system for a vehicle according to several implementations. In particular, FIG. 1A shows a vehicle 102 in the form of a tractor traveling on a substantially level surface, and FIG. 1B shows the tractor 102 encountering a roll event at a vehicle roll angle of $\theta_1$. It is appreciated that portions of the tractor 102 shown in FIGS. 1A and 1B have been omitted to facilitate description of various implementations. Various references are made herein to a pitch, roll, and yaw axis of a vehicle. Turning briefly to FIG. 7, an example illustration of a coordinate system showing a roll, a pitch, and a yaw axis of a vehicle 702 according to various aspects and implementations is shown. When traveling in a straight line, the vehicle 702 travels in the direction of travel indicated by line 704 and along a roll axis (x-axis). Extending perpendicular to the roll axis is the pitch axis (y-axis), about which the vehicle 702 may pitch when the front tires 706, or rear tires 708, encounter an obstacle. The yaw axis (z-axis) extends orthogonal to the roll axis and pitch axis. The vehicle rotates about the yaw axis when the vehicle 702 is steered, as shown in FIG. 7. Rotation is represented by ghost line 710.

Returning to FIGS. 1A and 1B, a payload (e.g., person 104) is shown supported in the seat 106 in a substantially vertical orientation along an imaginary reference vertical centerline 108 which passes through the body of the person 104 who is sitting in the seat 106. In this example, the vertical centerline 108 bisects the person 104 and the seat 106 when both the seat 106 and the vehicle 102 are in a nominal, substantially level horizontal orientation as shown in FIG. 1A. This is because the seat 106 is substantially symmetrical as viewed in FIG. 1A. In other types of vehicles, the seat 106 may be located to the left or right of the vertical centerline 108.

The seat 106 may be secured to the floor 110 of the vehicle via a support structure 112. The support structure 112 includes a pivot 128 which permits the seat 106 to move or rotate relative to the substantially horizontal orientation about a first axis 114 which is substantially parallel to a direction in which the vehicle 102 is moving when the vehicle 102 is moving in a straight line. FIGS. 1A and 1B show the axis 114 located at a distance below the seat 106, and in various implementations the axis 114 may be located higher or lower than shown. The axis 114 is fixed relative to the vehicle 102. In various implementations the vehicle 102 may roll about a second axis 116 which is substantially parallel with the axis 114 and the direction in which the vehicle 102 is moving.

As shown in FIGS. 1A and 1B, a distance $L_1$ represents the length between the first axis 114 and the second axis 116. A second distance, $L_2$, represents the length between the first axis 114 and a substantially center virtual point of the payload (e.g., a center of a head 118 of the occupant 104 of the vehicle 102). In various implementations, the top end of $L_2$ will reside at or above a position associated with the head of a person sitting in the seat, and for example, may be in a range of 3-5 feet.

In FIG. 1B, the left tires 120 of the vehicle 102 have hit an obstruction 122 in the surface over which the vehicle 102 is traveling, causing the vehicle 102 to rotate counter-clockwise (when viewed from the front). Rotation of the vehicle 102 about the second axis 116 is an approximation for the rotation of the vehicle 102 about the bottom of the right tires and is used for symmetry. The vehicle 102 has approximately rotated by the angle $\theta_1$, which represents the angle between the vertical centerline 108 and a vehicle centerline 124. If the seat 102 is not positioned at the center of the vehicle 102 (i.e., positioned to one or the other side of the center), then $\theta_1$ is determined by the rotation of the vehicle centerline 124 from the nominal position in FIG. 1A to a rotated position (e.g., in FIG. 1B). In several implementations, when the vehicle 102 rotates counter-clockwise the seat 106 is rotated about the axis 114 clockwise (opposite the direction of roll of the vehicle 102). The seat 106 may be rotated by an actuator coupled to the support structure 112. Similarly, when the vehicle 102 rotates clockwise the seat 106 is rotated about the axis 114 counter-clockwise. In both implementations, a controller in communication with at least the actuator provides a force command to cause the actuator to rotate the seat by the angle $\theta_2$, which is the angle between the vehicle centerline 124 and a seat centerline 126 (i.e., an angle from a nominal substantially horizontal position).

In various implementations, $\theta_2$ may be generated based at least in part on a first signal of detected movement of the vehicle 102, and a second signal of detected lateral acceleration of the pivot 128. For instance, in one example the angle $\theta_2$ is determined by the controller according to:

$$\theta_2 = \theta_1 + \frac{\int\int(\ddot{x} - (\text{speed} * \text{yaw rate}))}{L_2},$$

in which, $\theta_1$ is the rotation of the vehicle 102 about the second axis 116 (i.e., the vehicle roll angle), $\ddot{x}$ is a lateral acceleration of the pivot 128, speed is a speed of the vehicle 102, yaw rate is a yaw rate of the vehicle 102, and $L_2$ is the distance between the first axis 114 and a substantially center virtual point 130 of the payload. In further examples, the controller is configured to determine whether a frequency of the first signal exceeds a threshold, before generating the control signal. In such an implementation, the controller detects a frequency of the first signal and compares it to the threshold. If the threshold is exceeded (i.e., the frequency of the first signal is greater than the threshold), or the frequency is equal to the threshold, the controller generates the command signal based on the first signal of detected rotation of the vehicle 102 and the second signal of detected lateral acceleration of the pivot 128, as described above. If the threshold is not exceeded (i.e., the frequency of the first signal is less than threshold), the angle $\theta_2$ is determined by the controller according to:

$$\theta_1 + \left(\frac{L_1}{L_2}\right)\theta_1,$$

in which, $\theta_1$ is the rotation of the vehicle about the second axis 116, $L_2$ is the distance between the pivot 128 and the substantially center virtual point of the payload, and $L_1$ is a distance between the first axis 114 and the second axis 116. Such an implementation maintains the payload at a static position despite disturbances of variable amplitude.

In various implementations, locating the axis 114 close to the floor 110 is preferable because $\theta_2$ may increase when $L_1$ increases relative to $L_2$. Accordingly, larger rotations may be required to compensate for a fixed amount of roll if the height of the axis 114 is increased from the floor 110. As a result, the person 104 is rotated about a position to substantially reduce or minimize side-to side and/or front/back movement. In various implementations, the head 118 of the occupant remains substantially on the original vertical centerline 108 at a static position despite movement of the vehicle 102.

Figure 2:
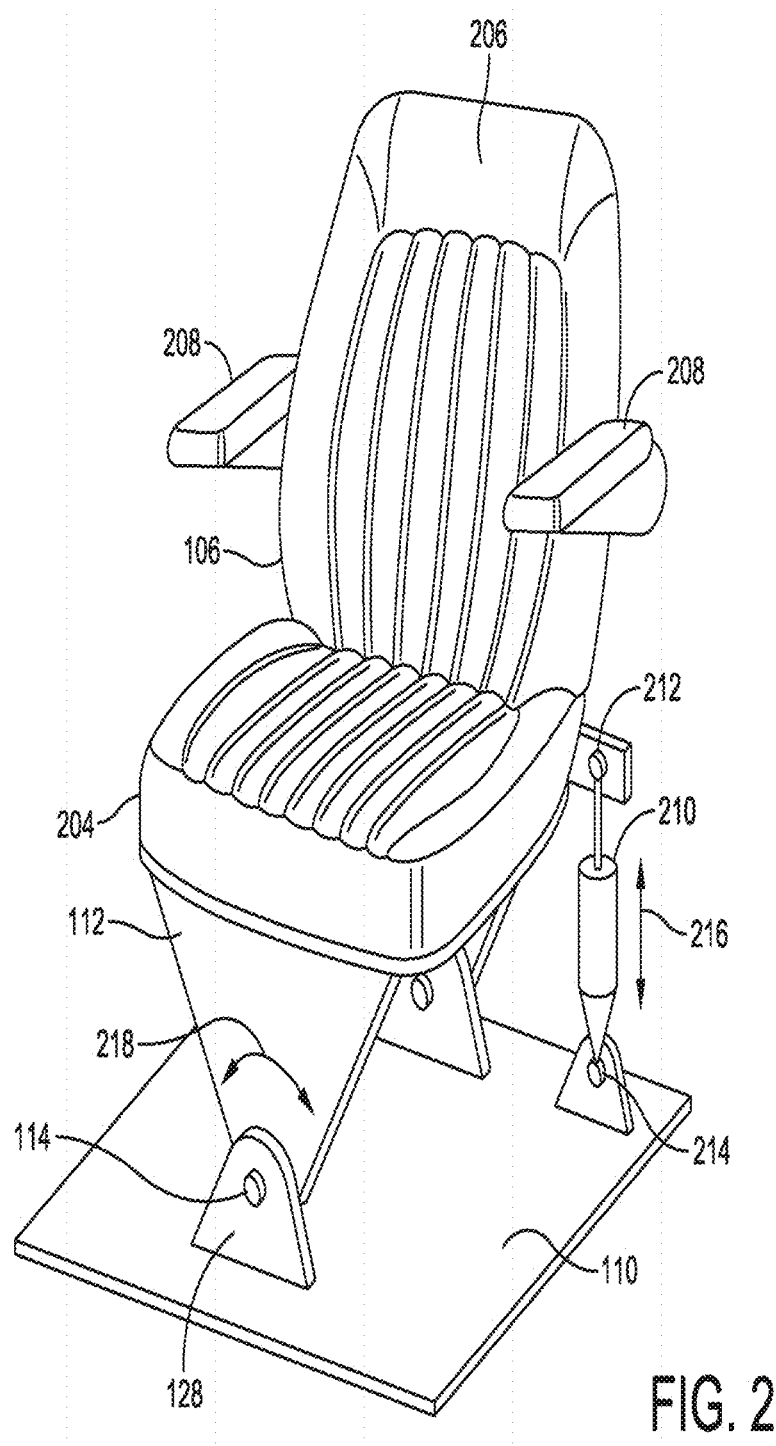
FIG. 2 is an illustration of an example vehicle seat and vehicle seat system according to various aspects discussed herein.

Turning now to FIG. 2 with continuing reference to FIGS. 1A-1B, shown is one example of a vehicle seat system including a vehicle seat, such as vehicle seat 106 shown in FIGS. 1A and 1B. The seat 106 is shown with a bottom 204 and a seat back 206 which is connected to the bottom 204. A pair of arms 208 extends forward from the seat back 206. An advantage of this seat system is that any impact of the arms 208 against a torso of the person 104 due to side-to-side rocking of the vehicle 102 will be substantially reduced (or minimized). A similar improvement will occur on the seat back 206 whereby the lateral translation of the seat back 206 relative to a person's back will also be substantially reduced. A linear actuator 210 is pivotally connected to the support structure 112 (at a location 212) and can interact with the seat 106 to cause the seat 106 to rotate about the axis 114. In this example, the linear actuator 210 is also pivotally connected to the floor 110 of the vehicle at a location 214. The linear actuator 210 is extended or retracted in the direction of a two-headed arrow 216 to cause the seat 106 to rotate about the axis 114 in the direction of a two-headed arrow 218. The linear actuator 210 can be, for example, an electromagnetic linear motor, a hydraulic cylinder, or a pneumatic cylinder. The linear actuator 210 instead can be some other type of actuator such as a rotary actuator (electromagnetic, hydraulic, or pneumatically powered) that is coupled between the seat 106 and the floor 110. Any type of actuator can be directly coupled to the seat 106 or it may act through some type of gear train, linkages or other transmission mechanism. The actuator 210 can be connected to a different portion of the support structure 112, or seat 106, and a different portion of the vehicle 102 (other than the floor 110, e.g. a wall of the driver compartment). Control of the actuator 210 is discussed below with reference to at least FIGS. 3-7.

The seat 106 is shown with only a single degree of freedom about the axis 114 (a roll axis) relative to the vehicle 102. This single degree of freedom could instead be about a pitch axis, a yaw axis, or about a plurality of axes (i.e., roll, pitch, and/or yaw). In this case, the axis 114 is oriented front-to-back as viewed in FIG. 1A and allows the seat 106 to be controlled for side to side rolling. In another example, the seat 106 may be outfitted with one or more additional actuators (not shown) to provide movement of the seat 106 in one or more additional degrees of freedom. For example, instead of mounting the intermediate support structure 112 to the floor 110, the intermediate support structure 112 can be mounted to a platform (not shown) which is moved up and down in the vertical direction by an additional actuator to reduce the vertical vibrations felt by the driver as the vehicle travels over a road (or this vertical actuator can be interposed between the structure and the seat). An example of this type of vertical active suspension system is shown in U.S. Pat. No. 8,095,268, titled "ACTIVE SUSPENDING", which is incorporated herein by reference in its entirety. The vertical active suspension system can be operated independently of the rotating seat 106. The $L_2$ distance (FIGS. 1A and 1B) will vary with the motions associated with a vertical isolation mechanism. This effect can be included in the processor calculations based on inputs from a sensor which detects a distance between the platform and the floor. In addition, the vertical isolation system can be used to offset any potential raising or lowering of the head of the person due to the combined rotation of the vehicle (e.g., relative to the ground), and rotation of the seat relative to the vehicle. Further configurations for a vehicle seat and vehicle seat system may include those described in U.S. Pub. No. 2014/0316661, titled "SEAT SYSTEM FOR A VEHICLE," which is hereby incorporated by reference herein in its entirety.

Figure 3:
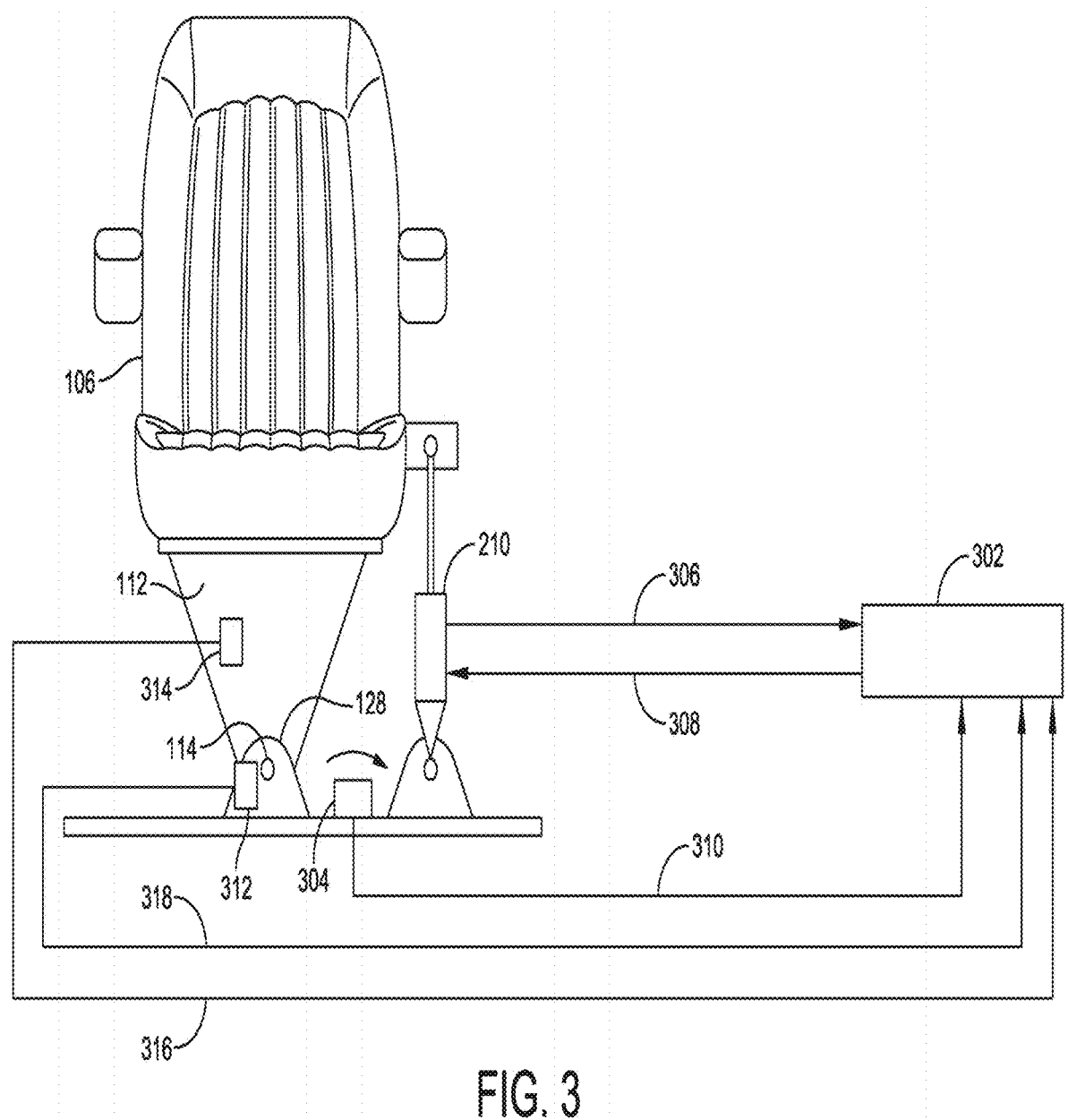
FIG. 3 is a further illustration of an example vehicle seat and vehicle seat system according to various aspects discussed herein.

Turning to FIG. 3, operation of the actuator 210 is controlled by a controller 302. A first sensor 304 can measure an aspect of motion, which in this example is a roll rate of the vehicle. The controller 302 may receive a signal (i.e., input) from the first sensor 304 in the form of roll rate data via a bus 310. The controller 302 calculates the integral of the roll rate data to determine an instantaneous vehicle roll angle $\theta_1$ (FIG. 1B). In various other examples, the input from the first sensor includes a component of a vehicle roll rate, and the controller is configured to calculate the vehicle roll rate based on at least the component of the vehicle roll rate. A second sensor 312 can measure a second aspect of motion, which in this example is a lateral acceleration of the pivot 128. In one example, the second sensor 312 is an accelerometer positioned on the pivot 128 at substantially the same height (or location) as the axis 114. However, in various other examples the accelerometer may be positioned on the vehicle 102, the support structure 112, or the seat 106. The controller 302 may receive a second signal (i.e., second input) from the second sensor 312 in the form of a lateral acceleration of the pivot 128 via a bus 318. In various other examples, the second input includes a second component of a lateral acceleration of the pivot 128, and the controller 302 may be configured to calculate the lateral acceleration of the pivot 128 based on at least the second component. The controller 302 may then use $\theta_1$ and the lateral acceleration of the pivot 128 to generate a command signal including the instantaneous command angle $\theta_2$ (FIG. 1B), and correct the command signal for lateral accelerations caused by steering the vehicle. In further examples, such as when a frequency of the signal from the first sensor 304 is below a determined threshold, the controller may use $\theta_1$ along with $L_2$ and $L_1$, to generate a command signal including the instantaneous command angle $\theta_2$ (FIG. 1B).

In one example, the command signal is corrected based on a yaw rate measured by a third sensor 314 and a detected speed of the vehicle 102. In various implementations, the third sensor 314 may be positioned on the vehicle 102, the seat 106, or the support structure 112, as shown in FIG. 3. The third sensor 314 may include any yaw rate sensor, such as any gyroscopic device that measures the vehicle's angular velocity around its vertical axis. In further implementations, the third sensor 314 may include a steering wheel sensor positioned to determine the yaw rate of the vehicle 102 based on movement of a steering wheel. The controller 302 receives the yaw rate via a bus 316. The vehicle speed may be measured by one or more speed sensors (not shown) positioned to measure the rate at which the vehicle 102 is traveling. For instances, the speed sensor may be positioned near a gear of a transmission of the vehicle 102 to measure a speed relative to the rotation of the gear. Other appropriate methods for measuring the speed of the vehicle may be employed by further implementations and are within the scope of this disclosure. For instance, the speed sensor may include a global positioning system (GPS) adapted to determine a speed of the vehicle. In one example, the GPS uses time and location data to determine the speed of the vehicle 102 based on how much distance is covered within a given time frame. The measured speed of the vehicle is received by the controller 302 via a bus. The controller 302 may then subtract the product of the yaw rate and speed from the lateral acceleration of the pivot to remove any effects caused by steering the vehicle 102. Further examples for correcting the command signal for turning accelerations are described below with reference to FIGS. 4 and 5.

Next, the controller 302 uses a look-up table to determine the desired actuator position in order to achieve the calculated $\theta_2$. The actuator position look-up table may include any array that replaces a runtime computation with an indexing operation. For example, the actuator position look-up table may include an array of pre-calculated and indexed actuator positions stored in static program storage. Note that the controller 302 receives position data from the actuator 210 via a bus 306. The position data is indicative of a position of the actuator 210 which is correlated to a position of the seat 106 about the axis 114. As such, the controller 302 is informed of the current position (e.g., displacement) of the actuator 210 when generating the command signal. In various other examples, the controller may perform one or more runtime computations to determine the actuator position necessary to achieve the desired seat position. It should be noted various control laws such as PI, PID, or other known control laws, can be used in the implementations described herein.

The controller 302 then issues a force command to the actuator 210 via a bus 308 which causes the actuator 210 to move the seat to the desired position. By successively repeating these steps, the controller 302 utilizes input from the first sensor 304, the second sensor 312, and in further examples the third sensor 314, to determine a desired motion of the seat 106 about the axis 114, and then operates the actuator 210 to cause the desired motion of the seat 106 about that axis. This results in a reduction (or minimizing) of the acceleration of a payload (e.g., person's head) positioned in the seat 106 in a substantially horizontal direction. Preferably the controller 302 controls motion of the seat 106 in order to reduce displacement of the virtual center point 130 along the reference vertical centerline 108 as the vehicle 102 is rotated (e.g., about the axis 116 in FIG. 1B). This example is advantageous in that it (a) is substantially insensitive to lateral accelerations caused by turning (when the vehicle makes a left or right turn), and (b) requires minimal motion sensors. This arrangement assumes that there is a stationary roll center height (i.e., $L_1$ does not vary).

If it is desired to calculate $L_1$ continuously in real time as the vehicle 102 is moving, the controller 302 may calculate $L_1$ using the equation $L_1$=lateral velocity/roll rate where the lateral velocity is calculated by integrating the lateral acceleration signal. It should be noted that preferably gravity correction is done on the output of any lateral accelerometers described in this application. This means that the component of gravity coupled into the lateral accelerometer as the vehicle 102 and/or seat 106 rotates is taken into consideration.

Figure 4:
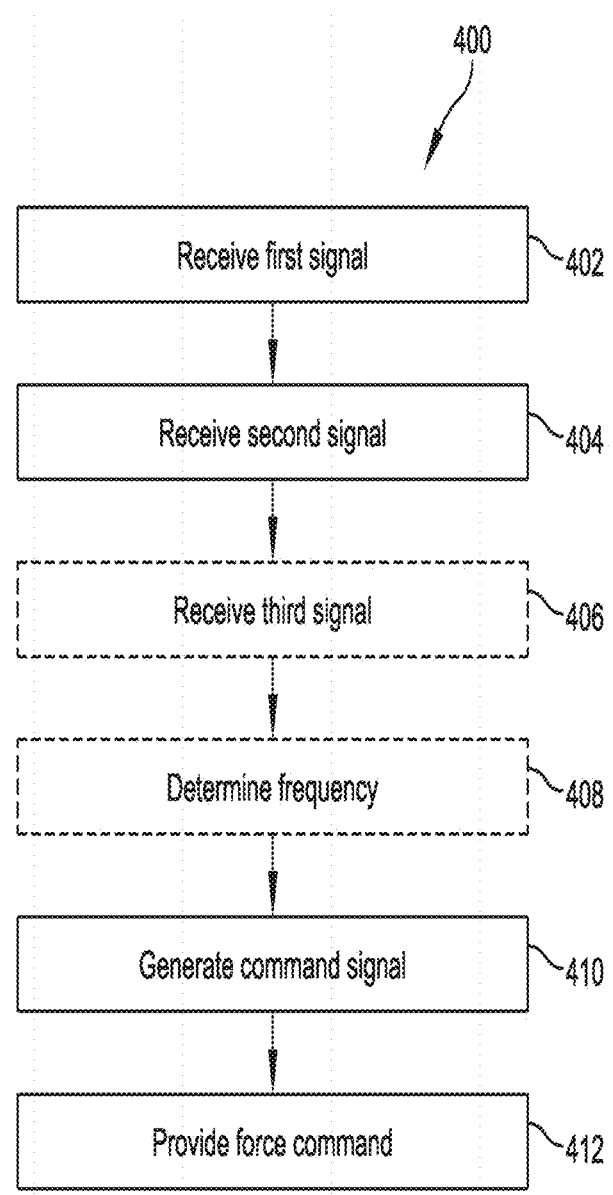
FIG. 4 is an illustration of a flow diagram for controlling vehicle seat movement according to various aspects discussed herein.

Various aspects and implementations discussed herein control movement of a platform to maintain a payload supported by the platform at a substantially static position, despite movement of a vehicle attached to the platform. At least one method for controlling movement of a platform is discussed below with reference to FIG. 4. In various examples, the method includes controlling movement of a vehicle seat during rotation of a vehicle. FIG. 4 is discussed with continuing reference to the vehicle seat and vehicle seat systems described above with reference to FIGS. 1-3. In various examples, such a method may include receiving a first signal, receiving a second signal, generating a command signal, and providing a force command. In further examples, the method may include receiving a third signal and determining a frequency of the first signal.

In act 402, the method may include receiving a first signal from a first sensor positioned to detect movement of the vehicle. In various examples, the first signal includes at least a roll rate of the vehicle about a second axis, such as the axis 116 shown in FIG. 1. The second axis may include an axis extending parallel to a direction of travel of the vehicle, as described above. The first signal is received by a controller via one or more data bus. Similarly, in act 404 the method may include receiving a second signal from a second sensor. In various examples, the second sensor is positioned to detect a lateral acceleration of a pivot having a first axis about which a support structure coupled to the seat allows movement of the seat. The seat may be rotated by an actuator, as discussed above, at a command angle relative to a substantially horizontal orientation.

In various examples, receiving the second signal includes receiving a lateral acceleration of the pivot in a direction substantially perpendicular to a direction of travel of the vehicle. For instance, this may include a total lateral acceleration of the vehicle during movement of the vehicle. The second signal is received by the controller via a second bus. In further examples, the method 400 may additionally include receiving a third signal from a third sensor positioned to detect a yaw rate of the vehicle (act 406). As described above, the yaw rate includes an angular acceleration about a vertical axis extending through the vehicle. A controller may receive the yaw rate from the third sensor via one or more bus. While not shown in FIG. 4, in further examples, the method may also include receiving additional signals from one or more additional sensors. For instance, in one implementation the controller receives a detected speed of the vehicle from a speed sensor. The speed sensor may be positioned proximate a gear of a transmission of the vehicle, or include a global positioning system (GPS), configured to detect and measure the rate at which the vehicle is traveling. Similar to the first signal, second signal, and/or yaw rate, the one or more additional signals may be received at the controller via a bus.

Turning to act 410, in various examples the method 400 includes generating a command signal based at least in part on the first signal and the second signal to instruct an actuator to position the seat at a desired command angle to maintain a payload at a static position during movement of the vehicle. In several implementations, this includes correcting the command signal for lateral accelerations caused by steering the vehicle. While using the lateral acceleration to generate a command signal offers significant improvements in performance over known control methods, such an approach is susceptible to inappropriate responses as a result of cornering accelerations. Accordingly, various aspects and implementations correct for such effects by removing cornering accelerations caused by steering the vehicle.

According to one example, the act of generating a command signal includes generating the command signal based at least in part on a rotation of the vehicle and a lateral acceleration of the pivot. The command signal may be used by the controller to instruct an actuator coupled to the seat to rotate the seat about the pivot at a command angle 82. As described above, often this includes rotating the seat in substantially an opposite direction from the rotation of the vehicle. In further examples, this includes generating the command signal based on the rotation of the vehicle, the lateral acceleration of the pivot, a yaw rate of the vehicle, a speed of the vehicle, and a distance between an axis about which the seat rotates and a substantially center virtual point of the payload. Such a process corrects the command signal for adverse effects as a result of accelerations from steering the vehicle around a corner. In particular, various examples include generating the command signal according to:

$$\theta_1 + \frac{\int\int (\ddot{x} - (\text{speed} * \text{yaw rate}))}{L_2},$$

in which, $\theta_1$ is the rotation of the vehicle about the second axis, $\ddot{x}$ is the lateral acceleration of the pivot, speed is the speed of the vehicle, yaw rate is the yaw rate of the vehicle, and $L_2$ is the distance between the first axis and the substantially center virtual point of the payload. In such an implementation, the distance $L_2$ is determined by measuring the distance from the first axis, about which the support structure coupled to the seat allows movement of the seat, to the center of the payload of interest. For instance, this may include the center of the head of an average height person sitting in the seat.

In act 412, the method 400 provides one or more force commands to the actuator to move the seat at the desired command angle based on at least the command signal. For example, the controller may use a look-up table to determine the desired actuator position to achieve the calculated $\theta_2$. The actuator position look-up table may include any array that replaces a runtime computation with an indexing operation, as described above with reference to FIG. 3. For example, the actuator position look-up table may include an array of pre-calculated and indexed actuator positions stored in static program storage. In other examples, the controller may perform one or more runtime computations to determine the desired actuator position in order to achieve the calculated $\theta_2$.

As discussed above, the actuator can induce roll (and/or pitch) into the vehicle seat, or a support structure attached to the vehicle seat, to isolate the payload from vehicle movement. The force command causes the actuator to rotate the seat by the angle $\theta_2$. In particular, electrical energy generated by the controller is delivered to the actuator causing the actuator to extend or retract to a predetermined position specified by the command signal, causing the seat to rotate. As discussed above, the linear actuator can be, for example, an electromagnetic linear motor, a hydraulic cylinder, or a pneumatic cylinder. The linear actuator instead may also be some other type of actuator such as a rotary actuator (electromagnetic, hydraulic, or pneumatically powered) that is coupled between the seat and the floor of the vehicle.

In act 408, according to one example the method 400 includes determining a frequency of the first signal (i.e., the rotation of the vehicle). In various examples, this may include separating the signal into components above and below a frequency threshold using a linear frequency dependent filter. In various examples, the controller is configured to generate the command signal based on different algorithms depending on the relationship between the detected frequency and the threshold value. The threshold value, for instance, may include a user defined, or a dynamically created, threshold frequency. In at least one example, the threshold includes a frequency between about 0.1 Hz and about 1.0 Hz. If components of the detected frequency exceeds (i.e., is greater than), or equal to, the threshold, the controller may generate the command signal based on a first algorithm, and if components of the detected frequency is less than the threshold, the controller may generate the command signal based on a second algorithm, the second algorithm being different from the first algorithm.

In one example, responsive to comparing the detected frequency to the threshold and determining that the detected frequency exceeds the threshold, or is equal to the threshold, the method 400 includes generating the command signal according to:

$$\theta_1 + \frac{\int\int (\ddot{x} - (\text{speed} * \text{yaw rate}))}{L_2},$$

as described above. However, if responsive to comparing the detected frequency to the threshold the controller determines that the detected frequency is less than the threshold, the method 400 may include generating the command signal according to:

$$\theta_1 + \left(\frac{L_1}{L_2}\right)\theta_1,$$

in which, $\theta_1$ is the rotation of the vehicle about the second axis, $L_2$ is the distance between the first axis and the substantially center virtual point of the payload, and $L_1$ is a distance between the second axis and the first axis. $L_1$ and $L_2$ may be determined as described above. Accordingly, various aspects and implementations permit stabilization of the payload when an amplitude of the disturbance is large or small, causing the vehicle to rotate severely or minimally. Such implementations provide an improved active stabilization system.

Figure 5:
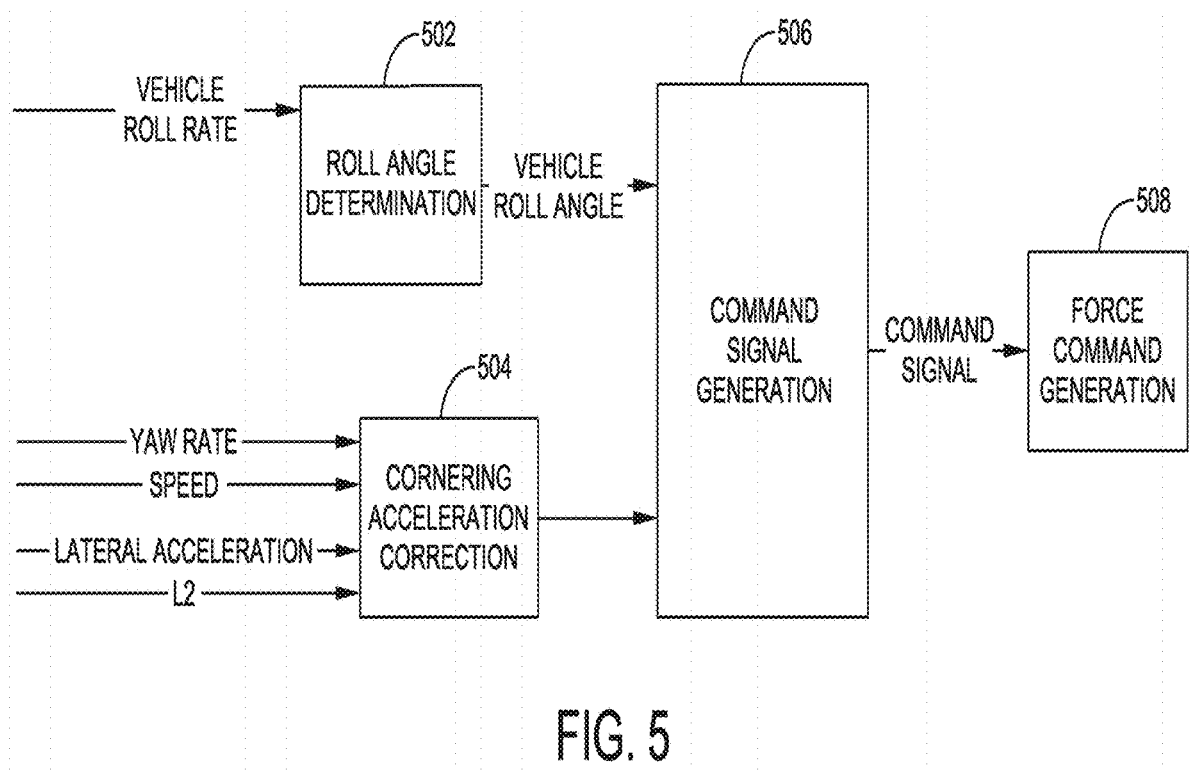
FIG. 5 is an illustration of a block diagram for controlling vehicle seat movement according to various aspects discussed herein.

Turning now to FIG. 5, shown is an illustration of a block diagram for controlling vehicle seat movement according to various aspects discussed herein. Processes described with reference to FIG. 5 may be performed by one or more controllers, such as the controller 302 described with reference to FIG. 3, or the controller 600 further described below with reference to FIG. 6. The controller may use any appropriate control law such as PI, PID, or other known control laws to implement the various processes. FIG. 5 is described with reference to FIGS. 1-4.

As discussed above with reference to FIGS. 1-4, the controller may receive a first input, a second input, and in further examples, additional inputs, from a first sensor, a second sensor, and one or more additional sensors. In various examples the first sensor is positioned to detect movement of the vehicle, the second sensor is positioned to determine a lateral acceleration of a pivot attached to the seat, a third sensor is positioned to determine a yaw rate of the vehicle, and a speed sensor is positioned to determine a speed of the vehicle. Accordingly, FIG. 5 shows the controller as receiving a vehicle roll rate, a yaw rate, a speed, and a lateral acceleration as a plurality of inputs. In one example, the controller may also receive as an input $L_2$, a distance between a substantially center virtual point of the payload and an axis of the pivot. In various other examples, the controller is configured to determine the distance $L_2$.

At block 502, the controller is configured to receive the signal from the first sensor 304 in the form of roll rate data via a bus. The controller calculates the integral of the roll rate data to determine an instantaneous vehicle roll angle $\theta_1$. In various examples, the vehicle roll angle includes the angle of rotation of the vehicle between a vertical centerline (e.g., vertical centerline 108 of FIG. 1) and a vehicle centerline (e.g., vehicle center 124 of FIG. 1).

At block 504, the controller is configured to receive the yaw rate, the speed, the lateral acceleration of the pivot point, and the distance $L_2$. Each input may be received by the controller via one or more bus. In generating the command signal, the controller is configured to correct the command signal for cornering accelerations that result from steering the vehicle. Often such forces have an undesirable effect on the command signal, such as inappropriately increasing or decreasing the command angle. Accordingly, at block 504 the controller may be configured to execute one or more algorithms to remove the effects of cornering acceleration from the lateral acceleration of the pivot point. In one example, this includes executing:

$$\frac{\iint (\ddot{x} - (\text{speed} * \text{yaw rate}))}{L_2},$$

in which, $\ddot{x}$ is the lateral acceleration of the pivot, speed is the speed of the vehicle, yaw rate is the yaw rate of the vehicle, and $L_2$ is the distance between the first axis and the substantially center virtual point of the payload. While in one example the controller may be configured to correct the command signal for the acceleration effects causing by steering the vehicle based on a vehicle speed and yaw rate, in various further examples the lateral acceleration caused by steering may be estimated based on other suitable calculations. For instance, in one example the controller may be configured to estimate and remove the lateral acceleration caused by steering from the lateral acceleration of the pivot based on a (speed)*(steering angle) calculation. For instance, the controller may subtract (speed)*(steering angle) from the lateral acceleration of the pivot. Steering angle may include the angle at which the vehicle is steered when traveling through a corner, and may be measured by a position sensor configured to detect movement of a steering wheel. In other examples, the lateral acceleration caused by steering may be estimated based on an estimated turning radius of the vehicle when traveling through the corner. Such information may be received from a GPS system and similarly removed from the lateral acceleration of the pivot. At block 506 the controller is configured to combine the result and the vehicle roll angle, having previously corrected for cornering accelerations. In various examples this includes adding the vehicle roll angle and the corrected lateral acceleration of the pivot.

At block 508, the controller provides one or more force commands to the actuator to move the seat at the desired command angle based on at least the command signal. For example, the controller may use a look-up table to determine the desired actuator position to achieve the calculated $\theta_2$, or perform one or more runtime computations to determine the desired actuator position. Such processes are further described above with reference to FIGS. 1-5.

Figure 6:
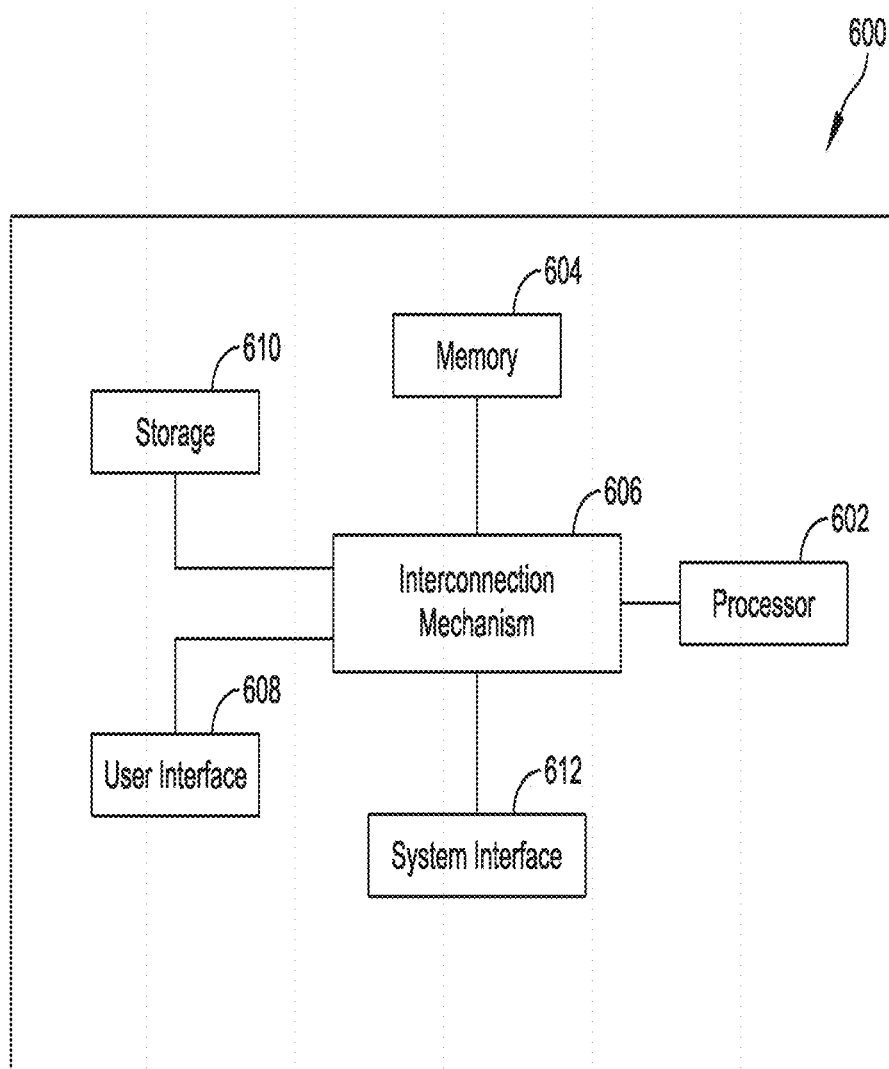
FIG. 6 is an illustration of a controller that may be used with various aspects discussed herein.

Referring to FIG. 6, there is illustrated a block diagram of a controller 600, in which various aspects and functions are practiced. FIG. 6 is described with reference to the several aspects and implementations discussed above with reference to FIGS. 1-5. For example, the controller 600 may include the controller 302 shown in FIG. 3. As shown, the controller 600 can include one or more system components that exchange information. More specifically, the controller 600 can include at least one processor 602, a power source (not shown), a data storage 610, a system interface 612, a user interface 608, a memory 604, and one or more interconnection mechanisms 606. The controller 600 may also include a power source (not shown) that provides electrical power to other components. The at least one processor 602 may be any type of processor or multiprocessor, and for example may include a digital signal processor. The at least one processor 602 is connected to the other system components, including one or more memory devices 604 by the interconnection mechanism 606. The system interface 612 couples one or more sensors or components (e.g., actuator 210) to the at least one processor 602.

The memory 604 stores programs (e.g., sequences of instructions coded to be executable by the processor 602) and data during operation of the controller 600. Thus, the memory 604 may be a relatively high performance, volatile, random access memory such as a dynamic random access memory ("DRAM") or static memory ("SRAM"). However, the memory 604 may include any device for storing data, such as a disk drive or other nonvolatile storage device. Various examples may organize the memory 604 into particularized and, in some cases, unique structures to perform the functions disclosed herein. These data structures may be sized and organized to store values for particular data and types of data.

Components of the controller 600 are coupled by an interconnection mechanism such as the interconnection mechanism 606. The interconnection mechanism 606 may include any communication coupling between system components such as one or more physical bus. The interconnection mechanism 606 enables communications, including instructions and data, to be exchanged between system components of the controller 600.

The controller 600 can also include one or more user interface devices 608 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the controller 600 to exchange information and to communicate with external entities, such as users and other systems.

The data storage element 610 includes a computer readable and writeable data storage medium configured to store non-transitory instructions and other data, and can include both nonvolatile storage media, such as optical or magnetic disk, ROM or flash memory, as well as volatile memory, such as RAM. The instructions may include executable programs or other code that can be executed by the at least one processor 602 to perform any of the functions described here below.

Although not illustrated in FIG. 6, the controller 600 may include additional components and/or interfaces, such as a communication network interface (wired and/or wireless), and the at least one processor 602 may include a power saving processor arrangement.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms. i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for a vehicle, the vehicle having a vehicle body, the system comprising:
    a platform constructed and arranged to be pivotally attached to the vehicle body;
    a first sensor configured to detect movement of the vehicle;
    a second sensor configured to detect lateral acceleration of at least a pivot point;
    at least one actuator arranged to move the platform relative to the vehicle body; and
    a controller configured to:
        receive a first signal from the first sensor and a second signal from the second sensor;
        determine a difference between a total lateral acceleration and a lateral acceleration due to turning, based on at least one of the first and second signal;
        based at least in part on the difference, determine a desired position of the platform relative to the vehicle body; and
        provide a force command to the at least one actuator to move the platform to the desired position.

2. The system of claim 1, wherein the platform is a seat.

3. The system of claim 2, wherein the first sensor is configured to detect a roll rate of the vehicle body.

4. The system of claim 3, further comprising a third sensor configured to detect a yaw rate of the vehicle, and wherein the controller is configured to:
    receive a third signal from the third sensor; and
    determine the desired position of the platform relative to the vehicle body based in part on the third signal.

5. The system of claim 4, further comprising a fourth sensor configured to detect an operating speed of the vehicle, and wherein the controller is configured to:
    receive a fourth signal from the fourth sensor; and
    determine the desired position of the platform relative to the vehicle body based in part on the fourth signal.

6. The system of claim 1, further comprising a payload mounted to the platform, wherein the payload is a member selected from the group consisting of a seat, a wheelchair, a gurney, a bed, and a neonatal incubator.

7. The system of claim 1, in combination with the vehicle.

8. A method of controlling movement of a platform pivotally mounted to a body of a vehicle, the method comprising:
    detecting movement of the vehicle;
    detecting lateral acceleration of the platform or a portion thereof;
    determining a difference between a total lateral acceleration and a lateral acceleration due to turning, based on at least the movement of the vehicle and the lateral acceleration of at least a portion of the platform;
    based at least in part on the difference, determining a desired position of the platform relative to the body of the vehicle; and
    operating at least one actuator to move the platform to the desired position of the platform relative to the body of the vehicle.

9. The method of claim 8, wherein detecting movement of the vehicle comprises detecting a roll rate of the vehicle.

10. The method of claim 9, further comprising detecting a yaw rate of the vehicle, and wherein the desired position of the platform relative to the body of the vehicle is determined based at least in part on the yaw rate.

11. The method of claim 10, further comprising detecting an operating speed of the vehicle, and wherein the desired position of the platform relative to the body of the vehicle is determined based at least in part on the operating speed.

12. An apparatus for moving a payload in a vehicle having a vehicle body, the apparatus comprising:
    a platform configured to support the payload; at least one actuator, with a first side configured to attach to the platform, and a second side configured to attach to the vehicle body; and
    a controller configured to:
        receive a first signal that is indicative of movement of the vehicle;
        receive a second signal that is indicative of detected lateral acceleration of the platform or a portion thereof;
        determine a difference between a total lateral acceleration and a lateral acceleration due to turning, based on at least one of the first and second signal;
        based at least in part on the difference, determine a desired position of the platform relative to the vehicle body; and
        provide a force command to the at least one actuator to move the platform to the desired position.

13. The apparatus of claim 12, wherein the platform is a seat.

14. The apparatus of claim 13, wherein the first signal is indicative of a roll rate of the vehicle body.

15. The apparatus of claim 14, wherein the controller is further configured to:
    receive a third signal that is indicative of a yaw rate of the vehicle; and
    determine the desired position of the platform relative to the vehicle body based in part on the third signal.

16. The apparatus of claim 15, wherein the controller is further configured to:
   receive a fourth signal that is indicative of an operating speed of the vehicle; and
   determine the desired position of the platform relative to the vehicle body based in part on the fourth signal.

17. The apparatus of claim 12, wherein the payload is a member selected from the group consisting of a seat, a wheelchair, a gurney, a bed, and a neonatal incubator.

18. The apparatus of claim 17, further comprising the payload.

19. The apparatus of claim 12, in combination with the vehicle.

* * * * *